United States Patent
Kataoka

(10) Patent No.: US 9,317,755 B2
(45) Date of Patent: Apr. 19, 2016

(54) TRAVEL LANE BOUNDARY LINE DETECTION APPARATUS

(71) Applicant: TOYOTA JIDOSHA KABUSHIKI KAISHA, Toyota-shi, Aichi (JP)

(72) Inventor: Yusuke Kataoka, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/609,572

(22) Filed: Jan. 30, 2015

(65) Prior Publication Data

US 2015/0227799 A1    Aug. 13, 2015

(30) Foreign Application Priority Data

Feb. 7, 2014 (JP) ................... 2014-022843

(51) Int. Cl.
G06K 9/48 (2006.01)
G06K 9/00 (2006.01)
G06K 9/46 (2006.01)
G06K 9/50 (2006.01)
G06T 7/00 (2006.01)

(52) U.S. Cl.
CPC ........ G06K 9/00798 (2013.01); G06K 9/00791 (2013.01); G06K 9/4604 (2013.01); G06K 9/4633 (2013.01); G06K 9/50 (2013.01); G06T 7/0085 (2013.01); G06T 2207/20164 (2013.01)

(58) Field of Classification Search
CPC .......... G06K 9/00798; G06K 9/00791; G06K 9/4633; G06K 9/50; G06K 9/4604; G06T 7/0085; G06T 2207/20164
See application file for complete search history.

(56) References Cited

U.S. PATENT DOCUMENTS

| | | | | |
|---|---|---|---|---|
| 7,792,327 B2* | 9/2010 | Fujimoto | ........... | G06K 9/00798 382/103 |
| 8,625,851 B2* | 1/2014 | Takiguchi | .......... | G01C 21/3602 382/100 |
| 2006/0239509 A1* | 10/2006 | Saito | .................... | G06K 9/6208 382/104 |
| 2011/0052079 A1 | 3/2011 | Tamura | | |
| 2011/0052080 A1 | 3/2011 | Tamura et al. | | |
| 2012/0300076 A1* | 11/2012 | Aimura | ..................... | B60R 1/00 348/148 |
| 2015/0227799 A1* | 8/2015 | Kataoka | ............... | G06K 9/4604 382/199 |

FOREIGN PATENT DOCUMENTS

| | | |
|---|---|---|
| JP | 2003-271930 A | 9/2003 |
| JP | 2011-053809 A | 3/2011 |
| JP | 2012-058984 A | 3/2012 |
| JP | 2013-120458 A | 6/2013 |
| JP | 2014-026519 A | 2/2014 |

* cited by examiner

*Primary Examiner* — Gregory M Desire
(74) *Attorney, Agent, or Firm* — Sughrue Mion, PLLC

(57) ABSTRACT

A travel lane boundary line detection apparatus includes: a determination unit configured to distinguish and determine a composite line region and a non-composite line region from a travel road surface image of a road surface; a calculation unit configured to calculate a candidate point of a central point of the composite line in a travel lane width direction; an extraction unit configured to detect a travel lane boundary line segment of the travel lane boundary line in the non-composite line region, and to extract a travel lane boundary point from the travel lane boundary line segment; an integration unit configured to create an integrated travel lane boundary point group based on the candidate point and on the travel lane boundary point; and an estimation unit configured to estimate a travel lane boundary line parameter representing the travel lane boundary line based on the integrated travel lane boundary point group.

10 Claims, 5 Drawing Sheets

TRAVEL LANE BOUNDARY LINE DETECTION APPARATUS

CROSS-REFERENCE TO RELATED APPLICATIONS

The present application claims priority to and incorporates by reference the entire contents of Japanese Patent Application No. 2014-022843 filed in Japan on Feb. 7, 2014.

BACKGROUND OF THE INVENTION

1. Field of the Invention

The present invention relates to a travel lane boundary line detection apparatus.

2. Description of the Related Art

As conventional travel lane boundary line detection apparatuses, Japanese Patent Application Laid-open No. 2013-120458, for example, discloses a road shape estimation apparatus for detecting plural edge lines from an image of a road surface in a travel region in which composite lines formed including travel lane boundary lines (for example, solid white lines) and auxiliary lines (for example, dotted white lines) are drawn on the travel road surface, coupling one or more of the edge lines to create composite edge lines, and determining road shape parameters including an offset in a lateral direction of a camera that has picked up the road surface and a road width based on the information of the inside composite edge line nearest to the central portion of a road. The road shape estimation apparatus determines a correction amount based on the distance between the inside composite edge line and an outside composite edge line, and corrects the offset in the lateral direction and the road width using the correction amount. With the operation, the road shape estimation apparatus can accurately estimate a road shape from the image of the road surface without being affected by auxiliary lines due to decreased resolution even in a travel road on which the auxiliary lines are painted in parallel with a travel lane marking.

Incidentally, in the road shape estimation apparatus described in Japanese Patent Application Laid-open No. 2013-120458, when the correction has been carried out to the offset in the lateral direction and to the road width of the road shape parameters that are based on the information of the inside composite edge line nearest to the center of a road at, for example, a switching point where the composite lines are switched with single lines formed by the travel lane boundary lines, there is a fear that the parameters representing the travel lane boundary lines in the travel region of the single lines are excessively offset to the outside of an actual road. Thus, the road shape estimation apparatus has a room for improvement in the point of estimation of the parameters for representing more appropriate travel lane boundary lines.

SUMMARY OF THE INVENTION

It is an object of the present invention to at least partially solve the problems in the conventional technology.

A travel lane boundary line detection apparatus according to one aspect of the present invention includes: a determination unit configured to distinguish and determine a composite line region, in which a composite line including a travel lane boundary line and an auxiliary line along the travel lane boundary line is drawn on a travel road surface, and a non-composite line region in which a single line formed by the travel lane boundary line is drawn on the travel road surface, from a travel road surface image of the road surface on which a vehicle travels; a calculation unit configured to calculate a candidate point of a central point of the composite line in a travel lane width direction that intersects a travel lane direction along the travel lane boundary line in the composite line region of the travel road surface image; an extraction unit configured to detect a travel lane boundary line segment of the travel lane boundary line in the non-composite line region of the travel road surface image, and to extract a travel lane boundary point from the travel lane boundary line segment; an integration unit configured to create an integrated travel lane boundary point group based on the candidate point of the central point of the composite line calculated by the calculation unit and on the travel lane boundary point extracted by the extraction unit; and an estimation unit configured to estimate a travel lane boundary line parameter representing the travel lane boundary line based on the integrated travel lane boundary point group created by the integration unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the invention will be described below in detail based on the drawings. Note that the invention is not restricted by the embodiment. Further, components in the embodiment include the components that can be easily replaced by a person skilled in the art or substantially the same components.

Embodiment

Figure 1:
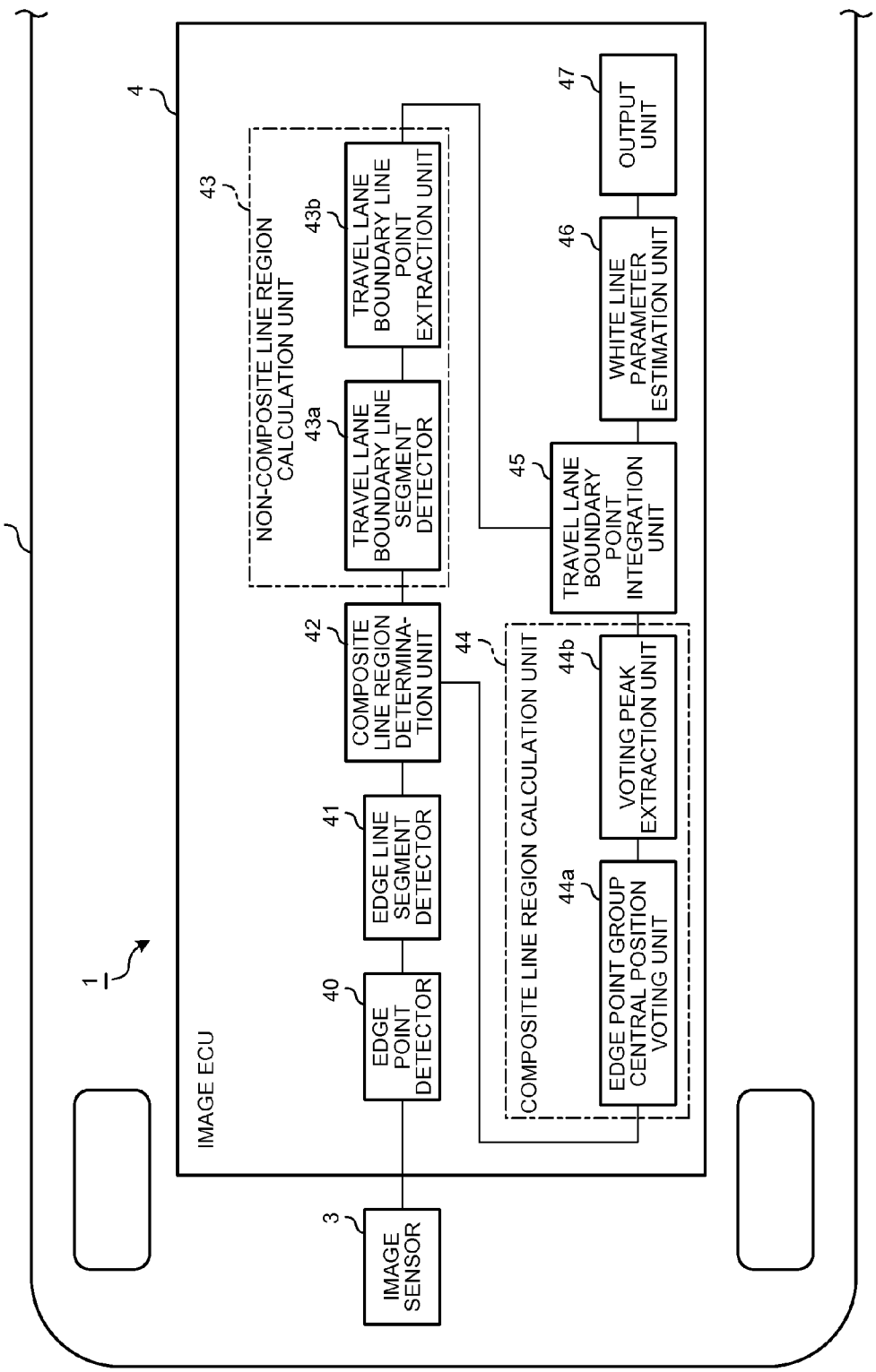
FIG. 1 is a schematic configuration view illustrating a travel lane boundary line detection apparatus according to an embodiment of the present invention.
Figure 2:
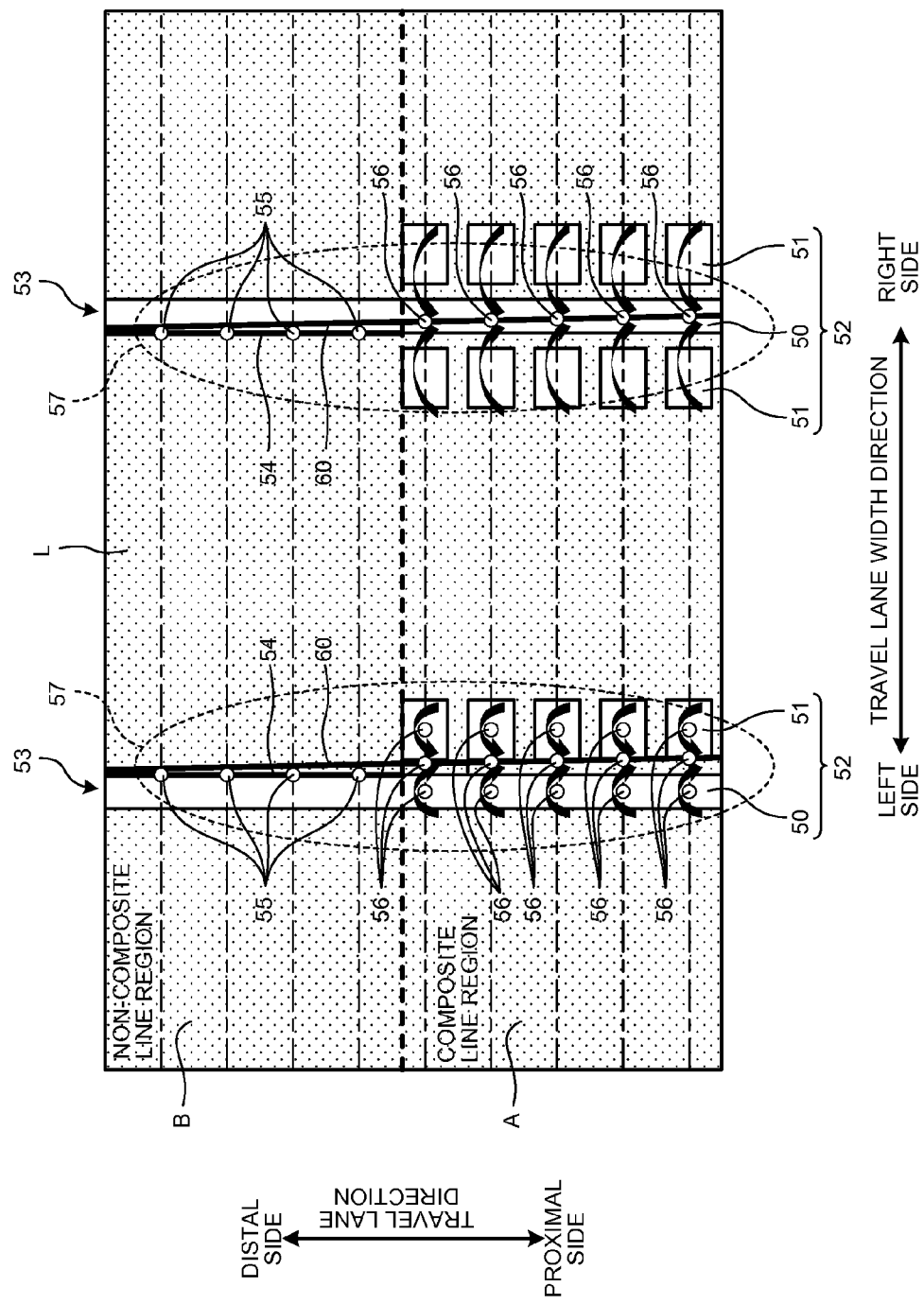
FIG. 2 is a schematic view illustrating an example of a travel road surface image used in the travel lane boundary line detection apparatus according to the embodiment.
Figure 3:
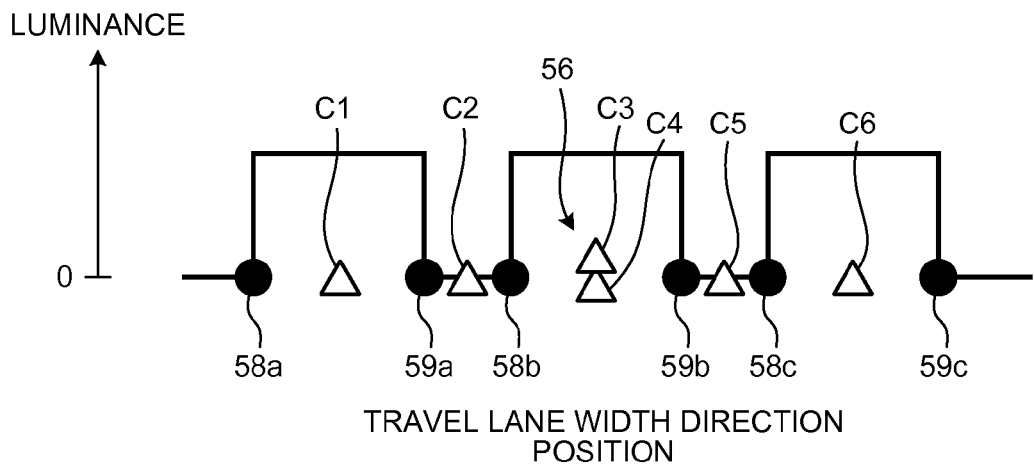
FIG. 3 is a schematic view explaining an example of a central-point candidate point calculation by the travel lane boundary line detection apparatus according to the embodiment.
Figure 4:
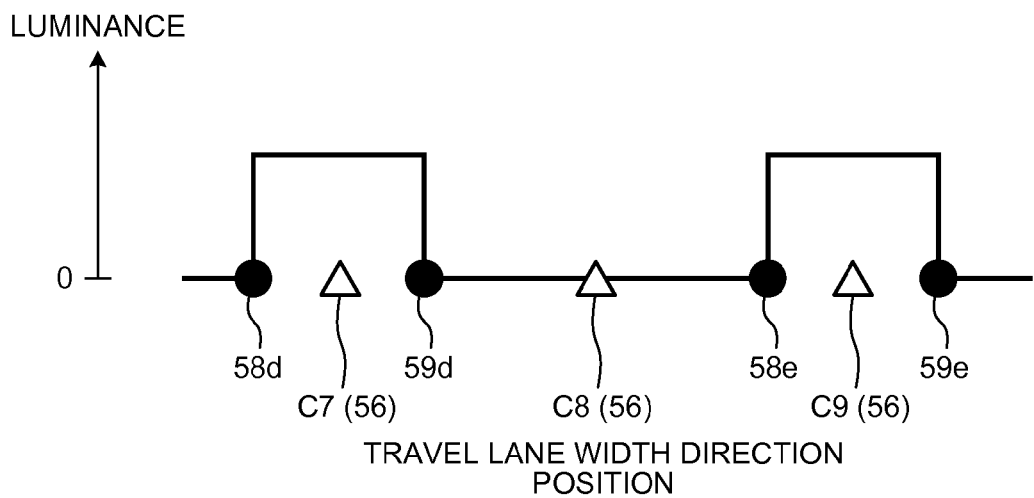
FIG. 4 is a schematic view explaining an example of a central-point candidate point calculation by the travel lane boundary line detection apparatus according to the embodiment.
Figure 5:
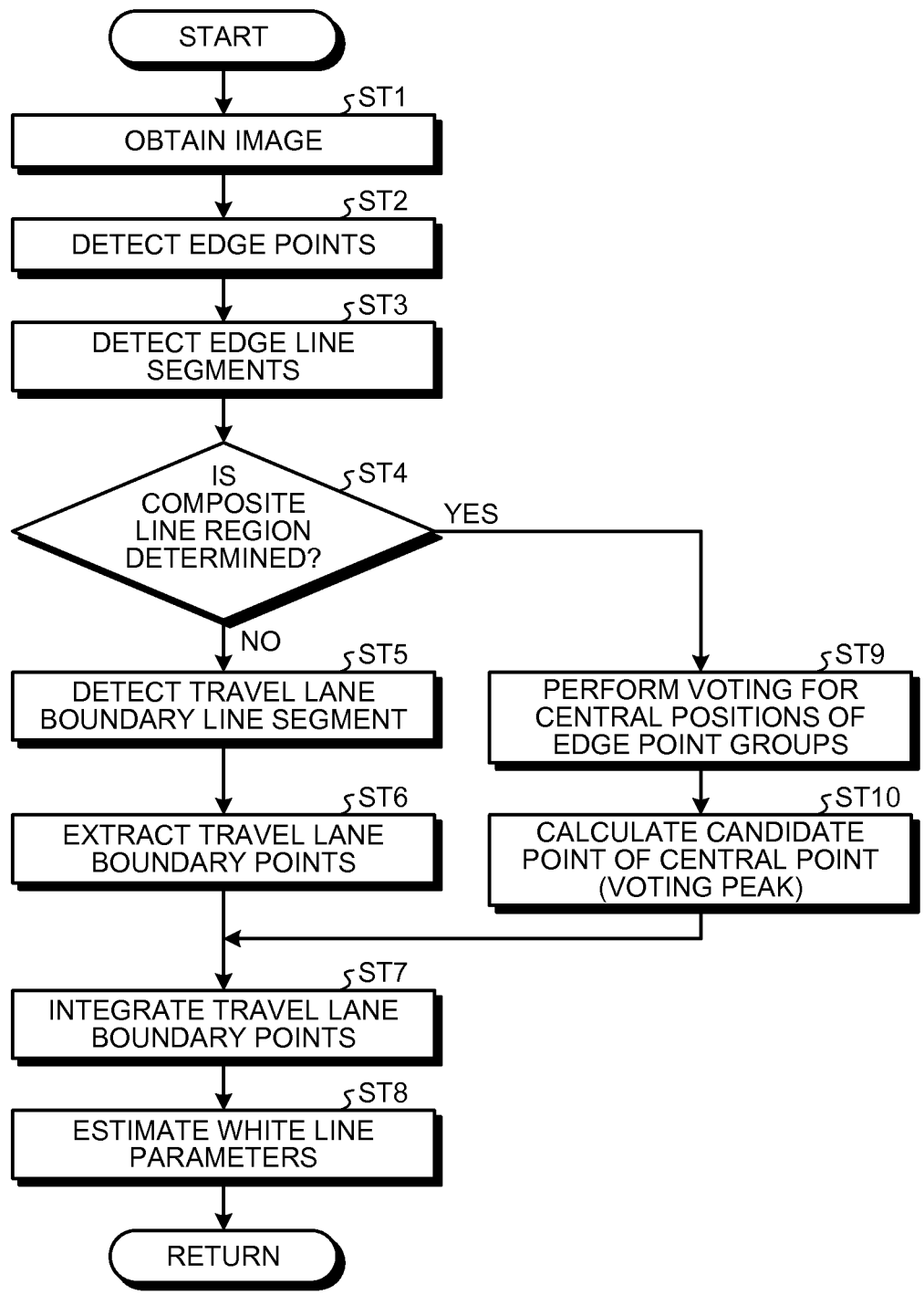
FIG. 5 is a flowchart illustrating an example of a processing flow by the travel lane boundary line detection apparatus according to the embodiment.
Figure 6:
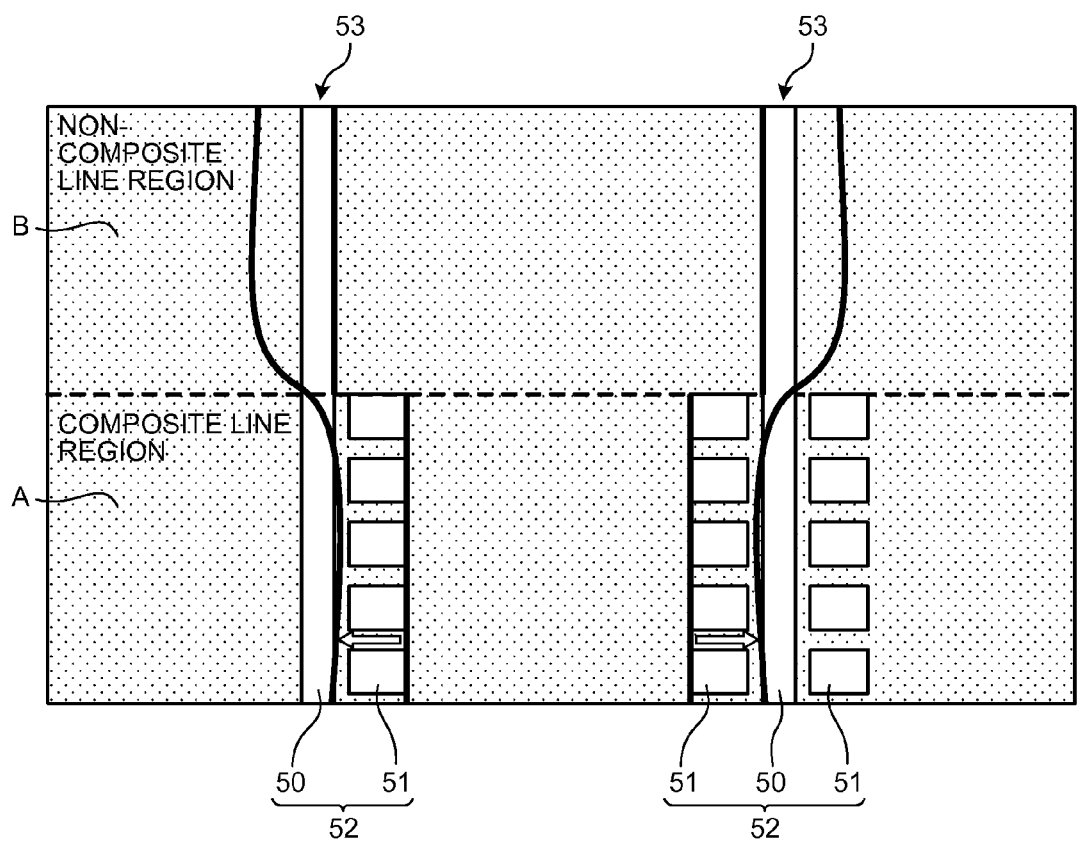
FIG. 6 is a schematic view explaining a travel lane boundary line detection apparatus according to a comparative example.

FIG. 1 is a schematic configuration view illustrating a travel lane boundary line detection apparatus according to an embodiment. FIG. 2 is a schematic view illustrating an example of a travel road surface image used in the travel lane boundary line detection apparatus according to the embodiment. FIG. 3 and FIG. 4 are schematic views explaining an example of a central-point candidate point calculation by the travel lane boundary line detection apparatus according to the embodiment. FIG. 5 is a flowchart illustrating an example of a processing flow by the travel lane boundary line detection apparatus according to the embodiment. FIG. 6 is a schematic view explaining a travel lane boundary line detection apparatus according to a comparative example.

A travel lane boundary line detection apparatus 1 according to the embodiment illustrated in FIG. 1 is mounted on a vehicle 2 as a driver's own vehicle and detects travel lane boundary lines drawn on a road surface on which the vehicle 2 travels. The travel lane boundary line detection apparatus 1 of the embodiment typically distinguishes a composite line region in which composite lines formed including the travel lane boundary lines and auxiliary lines are drawn on the travel road surface and a non-composite line region in which single lines formed by the travel lane boundary lines are drawn on the travel road surface and detects the travel lane boundary lines by making a feature point detection method different according to the respective regions. In, for example, the composite line region, the travel lane boundary line detection apparatus 1 performs voting for the predetermined central positions in the edge point groups of the composite lines and calculates a voting peak (the highest point in the voting) as a candidate point of the central point of the composite lines. On the other hand, in the non-composite line region, the travel lane boundary line detection apparatus 1 detects the travel lane boundary line segments of the travel lane boundary lines and extracts travel lane boundary points from the travel lane boundary line traffic line segments. Then, the travel lane boundary line detection apparatus 1 estimates travel lane boundary line parameters that show the travel lane boundary lines using an integrated travel lane boundary point group obtained by integrating the candidate points at the central points of the composite lines with the travel lane boundary points. With the operation, the travel lane boundary line detection apparatus 1 can appropriately detect the travel lane boundary line parameters that show the travel lane boundary lines. The travel lane boundary line detection apparatus 1 of the embodiment is realized by mounting the components illustrated in FIG. 1 on the vehicle 2. A configuration of the travel lane boundary line detection apparatus 1 will be specifically described below referring to FIG. 1 and FIG. 2.

Note that, as illustrated in FIG. 2, in the following description, the direction along a travel lane boundary lines 50 is called a travel lane direction and the direction orthogonal to (intersects with) the travel lane direction is called a travel lane width direction. Further, in the travel lane direction, the front side of the travel direction of the vehicle 2 may be called the distal side of the travel lane direction, the rear side of the travel direction may be called the proximal side of the travel lane direction, and, in the travel lane width direction, the left side to the distal side of the travel lane direction may be called the left side of the travel lane width direction, and the right side may be called the right side of the travel lane width direction.

Further, as illustrated in the travel road surface image exemplified in FIG. 2, the travel lane boundary lines 50 are boundary main lines for segmenting a travel lane L as traveling lines disposed on a road surface on which the vehicle 2 travels and disposed to both the right and left ends in the travel lane width direction. The travel lane boundary lines 50 are white solid lines. Thus, the travel lane boundary line parameters detected by the travel lane boundary line detection apparatus 1 are white line parameters. Hereinafter, the following description will be made assuming that the travel lane boundary line parameters are the white line parameters. Auxiliary lines 51 are lines along the travel lane boundary lines 50 and are subordinate lines for supporting the travel lane boundary lines 50. The auxiliary lines 51 are disposed adjacent to each other at intervals to the travel lane boundary lines 50 in the travel lane width direction. The auxiliary lines 51 herein are while dotted lines. The composite line region A is a region in which composite lines 52 formed including the travel lane boundary lines 50 and the auxiliary lines 51 are drawn on the travel road surface. In FIG. 2, a pair of the composite lines 52 are drawn on the right and left sides in the travel lane width direction. The composite line 52 on the left side of the travel lane width direction is configured of one travel lane boundary line 50 and one auxiliary line 51 disposed on the travel lane central side of the travel lane boundary line 50. The composite line 52 on the right side of the travel lane width direction is configured of one travel lane boundary line 50 and two auxiliary lines 51 disposed on the travel lane central side and the outside of the travel lane boundary line 50. In contrast, the non-composite line region B is a region in which a single line 53 formed by the travel lane boundary line 50 is drawn on the travel road surface. In FIG. 2, a pair of the single lines 53 is drawn on the right and left in the travel lane width direction. In FIG. 2, the region on the proximal side of the travel lane direction is the composite line region A, and the region on the distal side of the travel lane direction is the non-composite line region B. Further, although the following description will be made assuming that travel lane boundary line segments 54 of the travel lane boundary lines 50, which are detected by the travel lane boundary line detection apparatus 1 in the non-composite line region B, are the edge line segments on the central side of the travel lane of the travel lane boundary lines 50. However, the travel lane boundary line segments 54 may be the edge line segments on the outside thereof.

As illustrated in FIG. 1, the travel lane boundary line detection apparatus 1 includes an image sensor 3 as an image pick-up unit and an image ECU (Electronic Control Unit) 4 as an image processing unit. In the following description, the description as to specific processing will be appropriately made referring to FIG. 2.

The image sensor 3 picks up the road surface on which the vehicle 2 travels. The image sensor 3 is fixed in, for example, the vicinity of a room mirror at a predetermined angle of depression so as to be able to continuously pick up the road surface on which the vehicle 2 travels and outputs a picked-up travel road surface image that is an image of the travel road surface to the image ECU 4. As exemplified in FIG. 2, the image sensor 3 can pick up an image at a position far from the front of the vehicle 2 a predetermined distance. The image sensor 3 may be a monocular camera or a stereo camera. Further, the image picked up by the image sensor 3 may be monochrome or color.

The image ECU 4 subjects the travel road surface image picked up by the image sensor 3 to various kinds of image processing and detects the travel lane boundary lines 50. The image ECU 4 is configured including an electronic circuit mainly composed of a known microcomputer having a CPU, a ROM, a RAM, and an interface. The image ECU 4 is electrically connected with the image sensor 3 described above and input with an electric signal corresponding to a result of detection. Further, the image ECU 4 is electrically connected with various units for outputting the white line parameters of the detected travel lane boundary lines 50. The image ECU 4 continuously processes the travel road surface image that is the input image from the image sensor 3 at a predetermined sampling cycle.

Function-conceptually, the image ECU 4 of the embodiment is configured including an edge point detector 40, an edge line segment detector 41, a composite line region determination unit 42 as a determination unit, a non-composite line region calculation unit 43 as an extraction unit, a composite line region calculation unit 44 as a calculation unit, a travel lane boundary point integration unit 45 as an integration unit, and a white line parameter estimation unit 46 as an estimation unit, and an output unit 47. The edge point detector 40, the edge line segment detector 41, the composite line region determination unit 42, the non-composite line region calculation unit 43, the composite line region calculation unit 44, the travel lane boundary point integration unit 45, the white line parameter estimation unit 46, and the output unit 47 can transmit and receive various information between respective units, a storage unit, etc. via a unit electrically connected thereto.

The edge point detector 40 is connected to the image sensor 3 and detects edge points from the travel road surface image input from the image sensor 3. The edge points herein are the points that are assumed to configure the edges of the travel lane boundary lines 50 and the auxiliary lines 51 drawn on the travel road surface on the travel road surface image. The edge points are typically the points that position on the boundary of a region where brightness, luminance, etc. are greatly different, in other words, the points where brightness, luminance, etc. change abruptly. The edge point detector 40 continuously processes the travel road surface image from the image sensor 3 using various filters, etc. at a predetermined sampling cycle and detects the points where brightness, luminance, etc. abruptly change as the edge points. The edge point detector 40 uses a detection line along the travel lane width direction in the travel road surface image (refer to a single-dashed line in FIG. 2) as one line, and sequentially detects the edge points of respective detection lines at predetermined intervals in the travel lane direction at a predetermined sampling cycle from the travel road surface images sequential picked up as the vehicle 2 travels.

The edge line segment detector 41 is connected to the edge point detector 40, is input with the information as to the edge points detected by the edge point detector 40, and detects the edge line segments based on the input edge point groups. The edge line segment detector 41 performs linear approximation to the edge point groups that are detected by the edge point detector 40 in each detection line and are accumulated along the travel lane direction using various straight line detection methods, for example, Hough transform, etc., and detects the edge line segments that can become the candidates of the edges that configure the travel lane boundary lines 50 and the auxiliary lines 51.

The composite line region determination unit 42 is connected to the edge line segment detector 41 and distinguishes and determines the composite line region A in which the composite lines 52 are drawn on the travel road surface and the non-composite line region B in which the single line 53 is drawn on the travel road surface from the travel road surface image of the road surface on which the vehicle 2 travels. The composite line region determination unit 42 distinguishes and determines the composite line region A and the non-composite line region B based on, for example, the information as to the edge points detected by the edge point detector 40 and on the information as to the edge line segments detected by the edge line segment detector 41, etc. The composite line region determination unit 42 determines whether or not a region is the composite line region A or the non-composite line region B in each region of a preset and predetermined range based on, for example, the total number of the edge points, the total number of the edge line segments in a horizontal direction, the number of the edge line segments that configure a pair, etc. When, for example, the total number of the edge line segments and the total number of the edge points are equal to or more than previously set threshold values, the composite line region determination unit 42 determines that the region is the composite line region A. On the other hand, when the total number of the edge line segments and the total number of the edge points are less the threshold values, the composite line region determination unit 42 determines that the region is the non-composite line region B.

When it is determined by the composite line region determination unit 42 that a region is the non-composite line region B, the non-composite line region calculation unit 43 detects the travel lane boundary line segments 54 of the travel lane boundary lines 50 in the non-composite line region B of the travel road surface image and extracts travel lane boundary points 55 from the travel lane boundary line segments 54. The non-composite line region calculation unit 43 of the embodiment is configured to function-conceptually include a travel lane boundary line segment detector 43*a* and a travel lane boundary line point extraction unit 43*b*.

The travel lane boundary line segment detector 43*a* is connected to the composite line region determination unit 42. When it is determined by the composite line region determination unit 42 that the region is the non-composite line region B, the travel lane boundary line segment detector 43*a* detects the travel lane boundary line segments 54 of the travel lane boundary lines 50 based on the information as to the edge line segments detected by the edge line segment detector 41, etc. As described above, although the travel lane boundary line segments 54 detected by the edge line segment detector 41 are the edge line segments on the travel lane central side of the travel lane boundary lines 50, the travel lane boundary line segments 54 are not limited thereto and may be typically the edge line segments used by the control of the output destinations of the white line parameters. The travel lane boundary line segment detector 43*a* detects the edge line segments that are most suitable for the edge line segments on the travel lane central side of the travel lane boundary lines 50 as the travel lane boundary line segments 54 from the detected edge line segments from, for example, the positions, the lengths, and the tilts, etc. of edge line segments detected by the edge line segment detector 41. The travel lane boundary line segment detector 43*a* detects a travel lane boundary line segment 54 on each of the right and left sides in the travel lane width direction in a predetermined non-composite line region B.

The travel lane boundary line point extraction unit 43*b* is connected to the travel lane boundary line segment detector 43*a* and extracts the travel lane boundary points 55 from the respective travel lane boundary line segments 54 detected by the travel lane boundary line segment detector 43*a*. The travel lane boundary line point extraction unit 43*b* performs reverse lookup and decomposition of the respective travel lane boundary line segments 54 of each detected line to the edge points that configure the respective travel lane boundary line segments 54 and uses the edge points as the travel lane boundary points 55. The travel lane boundary line point extraction unit 43*b* extracts the travel lane boundary points 55 from the respective travel lane boundary line segments 54 on the right and left in the travel lane width direction in the predetermined non-composite line region B.

When it is determined by the composite line region determination unit 42 that the region is the composite line region A, the composite line region calculation unit 44 calculates candidate points 56 of the central points of the composite lines 52 in the travel lane width direction in the composite line region A of the travel road surface image. The composite line region calculation unit 44 performs voting for the predetermined central positions in, for example, the edge point groups of the composite lines 52, and calculates the highest points of the predetermined points as the candidate points 56 of the central points of the composite lines 52. More specifically, the composite line region calculation unit 44 combines the plural edge points on one side of the travel lane width direction and the plural edge points on the other side of the travel lane width direction, respectively. The plural edge points on both the sides are the edge points that are estimated to configure the travel lane boundary lines 50 and the auxiliary lines 51, from the plural edge point groups of the composite lines 52 arranged along the travel lane width direction in the composite line region A of the travel road surface image. The composite line region calculation unit 44 then performs voting for the central positions of the respective combinations in the travel lane width direction, and calculates the central position having the largest number of the votes, that is, the voting peak as the candidate point 56 of the central points of the composite lines 52. At the time, the composite line region calculation unit 44 selects the combinations of the edge points on one side and the edge points on the other side, where the edge points are disposed at intervals along the travel lane width direction within a preset threshold value, and performs the voting for the central positions of the selected combinations in the travel lane width direction. Thereby, the composite line region calculation unit 44 can perform the voting for the central positions excluding the combinations of the edge points in which it can be apparently estimated that the edge points do not configure the travel lane boundary lines 50 or the auxiliary lines 51. It is preferable that the threshold value is previously set according to, for example, the assumed width of the travel lane boundary lines 50 and the assumed width of the auxiliary lines 51, etc. Further, when the number of votes of the respective central positions is the same, the composite line region calculation unit 44 preferably calculates all the respective central positions as the candidate points 56 of the central points of the composite lines 52. The composite line region calculation unit 44 calculates the central points of the composite lines 52 as the candidate points 56 on each of the right and left sides in the travel lane width direction in the predetermined composite line region A. The composite line region calculation unit 44 of the embodiment is configured function-conceptually including an edge point group central position voting unit 44a and a voting peak extraction unit 44b.

Hereinafter, an example of calculation of the candidate points 56 of the central points of the composite lines 52 made by the edge point group central position voting unit 44a and the voting peak extraction unit 44b of the composite line region calculation unit 44 will be described referring to FIG. 3 and FIG. 4. In FIG. 3 and FIG. 4, a horizontal axis shows a travel lane width direction position and a vertical axis shows luminance on the travel road surface image. FIG. 3 illustrates the composite line 52 on the right side of the travel lane width direction, and FIG. 4 illustrates the composite line 52 on the left side of the travel lane width direction. Upward edge points 58a, 58b, 58c, 58d, 58e illustrated in FIG. 3 and FIG. 4 are the edge points where luminance abruptly increases from the left side to the right side of the travel lane width direction among the points whose luminance abruptly changes. In contrast, downward edge points 59a, 59b, 59c, 59d, 59e are the edge points where luminance abruptly decreases from the left side to the right side of the travel lane width direction among the points whose luminance abruptly changes.

The edge point group central position voting unit 44a is connected to the composite line region determination unit 42. When it is determined by the composite line region determination unit 42 that the region is the composite line region A, the edge point group central position voting unit 44a combines the plural edge points on one side of the travel lane width direction and the plural edge points on the other side of the travel lane width direction, respectively, the plural edge points on both the sides being the edge points that are estimated to configure the travel lane boundary lines 50 and the auxiliary lines 51, from the plural edge point groups of the composite lines 52 that are arranged along the travel lane width direction and performs voting for the central positions of the respective combinations in the travel lane width direction. The edge point group central position voting unit 44a performs voting for the central positions of the composite lines 52 on each of the right and left in the travel lane width direction in the predetermined composite line region A.

In an example of FIG. 3, the edge point group central position voting unit 44a selects the upward edge points 58a, 58b, 58c as the plural edge points, which are estimated to configure the travel lane boundary lines 50 and the auxiliary lines 51, on the one side of the travel lane width direction and selects the downward edge points 59a, 59b, 59c as the plural edge points on the other side. The edge point group central position voting unit 44a selects, for example, the upward edge point 58a and the downward edge point 59a, the downward edge point 59a and the upward edge point 58b, the downward edge point 59a and the upward edge point 58c, the upward edge point 58b and the downward edge point 59b, the downward edge point 59b and the upward edge point 58c, and the upward edge point 58c and the downward edge point 59c as the combinations whose intervals along the travel lane width direction are within the threshold value. Then, the edge point group central position voting unit 44a performs voting for a central position C1 between the upward edge point 58a and the downward edge point 59a, a central position C2 between the downward edge point 59a and the upward edge point 58b, a central position C3 between the downward edge point 59a and the upward edge points 58c, a central position C4 between the upward edge point 58b and the downward edge point 59b, a central position C5 between the downward edge point 59b and the upward edge points 58c, and a central position C6 between the upward edge points 58c and the downward edge points 59c.

In an example of FIG. 4, the edge point group central position voting unit 44a selects the upward edge points 58d, 58e as the plural edge points, which are estimated to configure the travel lane boundary lines 50 and the auxiliary lines 51, on the one side of the travel lane width direction and selects the downward edge points 59d, 59e as the plural edge points on the other side. The edge point group central position voting unit 44a selects, for example, the upward edge point 58d and the downward edge point 59d, the downward edge point 59d and the upward edge point 58e, and the upward edge points 58e and the upward edge point 59e as the combinations whose intervals along the travel lane width direction are within the threshold value. Then, the edge point group central position voting unit 44a performs voting for a central position C7 between the upward edge point 58d and the downward edge point 59d, a central position C8 between the downward edge point 59d and the upward edge point 58e, and a central position C9 between the upward edge point 58e and the downward edge point 59e.

The voting peak extraction unit 44b is connected to the edge point group central position voting unit 44a and calculates the candidate points 56 of the central positions of the composite lines 52 according to the voting by the edge point group central position voting unit 44a. The voting peak extraction unit 44b calculates the central position having the largest number of the votes, that is, the voting peak as the candidate point 56 of the central points of the composite lines 52. Further, when the numbers of votes of the respective central positions are the same, the voting peak extraction unit 44b calculates all the respective central positions as the candidate points 56 of the central points of the composite lines 52. The voting peak extraction unit 44b calculates the candidate points 56 of the central points of the composite lines 52 according to the voting for the central positions of the composite lines 52 on each of the right and left in the travel lane width direction in the predetermined composite line region A. In the example of FIG. 3, since the central positions C3, C4 are the voting peak, the voting peak extraction unit 44b calculates the central position C3 (C4) as the candidate point 56 of the central point of the composite lines 52. In the example of FIG. 4, since the numbers of votes of the respective central positions are the same, the voting peak extraction unit 44b calculates all the central positions C7, C8, C9 as the candidate points 56 of the central points of the composite lines 52.

Returning to FIG. 1, the travel lane boundary point integration unit 45 creates an integrated travel lane boundary point group 57 based on the candidate points 56 of the central points of the composite lines 52 calculated by the composite line region calculation unit 44 and on the travel lane boundary points 55 extracted by the non-composite line region calculation unit 43. The travel lane boundary point integration unit 45 is connected to the non-composite line region calculation unit 43 and the composite line region calculation unit 44, integrates the candidate points 56 of the central points of the composite lines 52 in the composite line region A and the travel lane boundary points 55 in the non-composite line region B, and configures them as the integrated travel lane boundary point group 57. The travel lane boundary point integration unit 45 integrates the candidate points 56 of the central points of the composite lines 52 and the travel lane boundary points 55 in the non-composite line region B on each of the right and left in the travel lane width direction in the predetermined composite line region A and creates the integrated travel lane boundary point group 57. The travel lane boundary point integration unit 45 sequentially updates the integrated travel lane boundary point group 57 so as to reflect the edge points that are sequentially detected along the travel lane direction according to a predetermined sampling cycle.

The white line parameter estimation unit 46 estimates the white line parameters as the travel lane boundary line parameters representing the travel lane boundary lines 50 based on the integrated travel lane boundary point group 57. The white line parameter estimation unit 46 is connected to the travel lane boundary point integration unit 45 and estimates the white line parameters by, for example, carrying out model fitting to the integrated travel lane boundary point group 57 that is integrated by the travel lane boundary point integration unit 45. The white line parameter estimation unit 46 estimates a curve representing the edge lines of the travel lane boundary lines 50 on the travel lane central side from the integrated travel lane boundary point group 57 using, for example, the least-squares method, etc. The white line parameter estimation unit 46 specifies a curve showing the edge lines of the travel lane boundary lines 50 on the travel lane central side from the integrated travel lane boundary point group 57 applying, for example, a cubic curve model shown by the following Expression (1).

$$x = a \cdot z^3 + b \cdot z^2 + c \cdot z + d \quad (1)$$

In Expression (1), "x" shows a travel lane width direction position, and "z" shows a travel lane direction distance. The white line parameter estimation unit 46 of the embodiment calculates coefficients a, b, c, d in, for example, Expression (1) as the white line parameters. In Expression (1), typically, the coefficient a shows the curvature change rate of the edge lines of the travel lane boundary lines 50 on the travel lane central side, the coefficient b shows the curvature of the edge lines of the travel lane boundary lines 50 on the travel lane central side, the coefficient c shows the tilt of the edge lines of the travel lane boundary lines 50 on the travel lane central side, and coefficient d shows the offset of the edge lines of the travel lane boundary lines 50 on the travel lane central side. The white line parameter estimation unit 46 calculates the white line parameters representing the edge lines of the travel lane boundary lines 50 on the travel lane central side from the integrated travel lane boundary point group 57 on each of the right and left sides of the travel lane width direction. The white line parameter estimation unit 46 sequentially updates the white line parameters based on the integrated travel lane boundary point group 57 that is sequentially updated according to the predetermined sampling cycle. White edge lines 60 exemplified in FIG. 2 are an example of the edge lines of the travel lane boundary lines (white lines) 50 on the travel lane central side shown by the white line parameters estimated by the white line parameter estimation unit 46.

The output unit 47 is connected to the white line parameter estimation unit 46 and outputs the white line parameters estimated by the white line parameter estimation unit 46 to various units. The output unit 47 outputs the estimated white line parameters to a controller for performing various controls using the white line parameters, for example, an LKA (Lane Keeping Assist) control for controlling the vehicle 2 so that the vehicle 2 does not depart from a travel lane L, etc.

Next, an example of a processing flow in the travel lane boundary line detection apparatus 1 will be described referring to a flowchart of FIG. 5. Note that these control routines are repeatedly carried out at a control cycle of several microseconds to several tens of microseconds.

First, the edge point detector 40 of the image ECU 4 obtains the travel road surface image picked up by the image sensor 3 (step ST1).

The edge point detector 40 detects the edge points that can become the candidates of the edge points that configure the travel lane boundary lines 50 and the auxiliary lines 51 from the travel road surface image obtained at step ST1 in each detected line along a line width direction and accumulates the edge points in a storage unit (step ST2).

The edge line segment detector 41 of the image ECU 4 detects the edge line segments that can become the candidates of the edges configuring the travel lane boundary lines 50 and the auxiliary lines 51, from the edge point groups in which the edge points detected in each detected line at step ST2 are accumulated, and accumulates the edge line segments in the storage unit (step ST3).

Next, the composite line region determination unit 42 of the image ECU 4 distinguishes and determines the composite line region A and the non-composite line region B from the travel road surface image based on the edge points accumulated in a predetermined region and the edge line segments accumulated in a predetermined region, and determines whether or not the region of predetermined ranges that are sequentially set as the vehicle 2 travels is the composite line region A (step ST4).

When it is determined by the composite line region determination unit 42 that the region of the predetermined ranges is not the composite line region A, that is, is the non-composite line region B (step ST4: No), the travel lane boundary line segment detector 43a of the non-composite line region calculation unit 43 of the image ECU 4 carries out the following processing. More specifically, the travel lane boundary line segment detector 43a detects the travel lane boundary line segments (the edge line segments on the travel lane central side) 54 of the travel lane boundary lines 50 based on the edge line segments accumulated in the region of the predetermined ranges and accumulates the travel lane boundary line segments in the storage unit (step ST5).

Next, the travel lane boundary line point extraction unit 43b of the non-composite line region calculation unit 43 of the image ECU 4 extracts the travel lane boundary points 55 from the travel lane boundary line segments 54 accumulated in the region of the predetermined ranges, accumulates the travel lane boundary points 55 in the storage unit (step ST6). Then, processing at step ST7 follows.

When it is determined by the composite line region determination unit 42 at step ST4 that the region of the predetermined ranges is the composite line region A (step ST4: Yes), the edge point group central position voting unit 44a of the composite line region calculation unit 44 of the image ECU 4 carries out the following processing. More specifically, the edge point group central position voting unit 44a combines the plural edge points on one side of the travel lane width direction and the plural edge points on the other side of the travel lane width direction, respectively, the plural edge points on both the sides being the edge points that are estimated to configure the travel lane boundary lines 50 and the auxiliary lines 51, from the plural edge point groups of the composite lines 52 arranged along the vehicle lane width direction based on the edge points accumulated in the region of the predetermined ranges. The edge point group central position voting unit 44a then performs voting for the central positions of the respective combinations in the travel lane width direction (step ST9).

Next, the voting peak extraction unit 44b of the composite line region calculation unit 44 of the image ECU 4 calculates the candidate points 56 of the central points of the composite lines 52 according to a result of voting by the edge point group central position voting unit 44a, accumulates the candidate points 56 in the storage unit (step ST10). Then, the processing at step ST7 follows. In the case, the voting peak extraction unit 44b calculates the central position having the largest number of votes, that is, the voting peak as the candidate point 56 of the central points of the composite lines 52. Further, when the number of votes of the respective central positions is the same, the voting peak extraction unit 44b calculates all the respective central positions as the candidate points 56 of central points of the composite lines 52.

In the processing at step ST7, the travel lane boundary point integration unit 45 of the image ECU 4 integrates the travel lane boundary line segments 54, which have been accumulated until the control cycle at the time, with the candidate points 56 of the central points of the composite lines 52, which have been accumulated until the control cycle at the time, and creates the integrated travel lane boundary point group 57 (step ST7).

Next, the white line parameter estimation unit 46 of the image ECU 4 estimates the white line parameters as the travel lane boundary line parameters that show the travel lane boundary lines 50 based on the integrated travel lane boundary point group 57 integrated by the travel lane boundary point integration unit 45 (step ST8), finishes the control cycle at the time, and goes to a next control cycle. In the case, the white line parameter estimation unit 46 calculates the coefficients a, b, c, d in Expression (1) as, for example, the white line parameters.

The travel lane boundary line detection apparatus 1 configured as described above estimates the white line parameters, based on the integrated travel lane boundary point group 57 that is based on the candidate points 56 of the central points of the composite lines 52 calculated in the composite line region A and on the travel lane boundary points 55 extracted in the non-composite line region B. Therefore, the travel lane boundary line detection apparatus 1 can appropriately detect the parameters representing the travel lane boundary lines 50 in any of the composite line region A, the non-composite line region B, and the switch region where the composite line region A and the non-composite line region B are switched. FIG. 6 shows an example of detection of white line parameters by a travel lane boundary line detection apparatus according to a comparative example. The travel lane boundary line detection apparatus according to the comparative example detects plural edge lines from a travel road surface image in a composite line region A, in which composite lines 52 formed by including travel lane boundary lines 50 and auxiliary lines 51 are drawn. The travel lane boundary line detection apparatus then creates composite edge lines by coupling one or more of the edge lines, and determines the white line parameters including a road width and the offset in a lateral direction of a camera by which the travel road surface image is picked up based on the information of the inside composite edge line nearest to the central portion of a road. The apparatus further determines a correction amount based on the distance between the inside composite edge line and an outside composite edge line, and corrects the white line parameters. There may be a case in which, when the travel lane boundary line detection apparatus according to the comparative example has applied the correction as described above to the white line parameters that are based on the information of the inside composite edge line nearest to the central portion of the road in the switching position of, for example, the composite lines 52 and the single lines 53, that is, the switching region of the composite line region A and the non-composite line region B. In such a case, as illustrated in FIG. 6, the white edge line on the travel lane central side of the travel lane boundary lines 50 shown by the white line parameters in the non-composite line region B is excessively offset to the outside of the road than an actual central side. In contrast, since the travel lane boundary line detection apparatus 1 estimates the white line parameters based on the integrated travel lane boundary point group 57 as described above, even in the switching region of the composite line region A and the non-composite line region B, the white edge line 60 on the travel lane central side of the travel lane boundary lines 50 shown by the white line parameters can be suppressed from being excessively offset to the outside of an actual road as illustrated in FIG. 2.

According to the travel lane boundary line detection apparatus 1 described above, the composite line region determination unit 42, the composite line region calculation unit 44, the non-composite line region calculation unit 43, the travel lane boundary point integration unit 45, and the white line parameter estimation unit 46 are provided. The composite line region determination unit 42 distinguishes and determines the composite line region A, in which the composite lines 52 formed including the travel lane boundary lines 50 and the auxiliary lines 51 along the travel lane boundary lines 50 are drawn on the travel road surface, and the non-composite line region B in which the single lines 53 formed by the travel lane boundary lines 50 are drawn on the travel road surface, from the travel road surface image obtained by picking up the road surface on which the vehicle 2 travels. When it is determined by the composite line region determination unit 42 that a region is the composite line region A, the composite line region calculation unit 44 calculates the candidate points 56 of the central points of the composite lines 52 in the travel lane width direction that intersects the travel lane direction along the travel lane boundary lines 50 in the composite line region A of the travel road surface image. When it is determined by the composite line region determination unit 42 that the region is the non-composite line region B, the non-composite line region calculation unit 43 detects the travel lane boundary line segments 54 of the travel lane boundary lines 50 in the non-composite line region B of the travel road surface image, and extracts the travel lane boundary points 55 from the travel lane boundary line segments 54. The travel lane boundary point integration unit 45 creates the integrated travel lane boundary point group 57, based on the candidate points 56 of the central points of the composite lines 52 calculated by the composite line region calculation unit 44 and the travel lane boundary points 55 extracted by the non-composite line region calculation unit 43. The white line parameter estimation unit 46 estimates the white line parameters representing the travel lane boundary lines 50 based on the integrated travel lane boundary point group 57 created by the travel lane boundary point integration unit 45. Thus, since the travel lane boundary line detection apparatus 1 estimates the white line parameters based on the integrated travel lane boundary point group 57 that is based on the candidate points 56 of the central points of the composite lines 52 calculated in the composite line region A and on the travel lane boundary points 55 extracted by the non-composite line region B, the travel lane boundary line detection apparatus 1 can appropriately detect the parameters showing the travel lane boundary lines 50.

The calculation method of the candidate points 56 of the central points by the composite line region calculation unit 44 is not limited to the method described above. The composite line region calculation unit 44 may use the middle between the edge point nearest to the travel lane central side and the edge point nearest to the outside of the travel lane in, for example, the edge points that are estimated to configure the composite lines 52 as the candidate points 56 of the central points of the composite lines 52. Further, the composite line region calculation unit 44 may calculate the candidate points 56 of the central points of the composite lines 52 by applying a statistical processing to the edge points accumulated in, for example, a predetermined travel distance and a predetermined time and using a frequency distribution, etc.

Since the travel lane boundary line detection apparatus according to the embodiment of the present invention estimates the travel lane boundary line parameters based on the integrated travel lane boundary point group that is based on the candidate points of the central points of the composite lines calculated in the composite line region in which the composite lines are drawn on the travel road surface and on the travel lane boundary points extracted in the non-composite line region in which the single lines are drawn on the travel road surface. Accordingly, the travel lane boundary line detection apparatus can achieve an effect of appropriately detecting parameters representing travel lane boundary lines in any of the composite line region, the non-composite line region, and the switch region where the composite line region and the non-composite line region are switched to each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A travel lane boundary line detection apparatus comprising:
    a determination unit configured to distinguish and determine a composite line region, in which a composite line including a travel lane boundary line and an auxiliary line along the travel lane boundary line is drawn on a travel road surface, and a non-composite line region in which a single line formed by the travel lane boundary line is drawn on the travel road surface, from a travel road surface image of the road surface on which a vehicle travels;
    a calculation unit configured to calculate a candidate point of a central point of the composite line in a travel lane width direction that intersects a travel lane direction along the travel lane boundary line in the composite line region of the travel road surface image;
    an extraction unit configured to detect a travel lane boundary line segment of the travel lane boundary line in the non-composite line region of the travel road surface image, and to extract a travel lane boundary point from the travel lane boundary line segment;
    an integration unit configured to create an integrated travel lane boundary point group based on the candidate point of the central point of the composite line calculated by the calculation unit and on the travel lane boundary point extracted by the extraction unit; and
    an estimation unit configured to estimate a travel lane boundary line parameter representing the travel lane boundary line based on the integrated travel lane boundary point group created by the integration unit.

2. The travel lane boundary line detection apparatus according to claim 1, wherein the calculation unit
    combines a plurality of edge points on one side of the travel lane width direction and a plurality of edge points on the other side of the travel lane width direction, respectively, the plurality of the edge points on both sides being the edge points that are estimated to configure the travel lane boundary line and the auxiliary line, from a plurality of edge point groups of the composite line arranged along the travel lane width direction, in the composite line region of the travel road surface image,
    performs voting for central positions of the respective combinations in the travel lane width direction, and
    calculates the central position with the largest number of votes as the candidate point of the central point of the composite line.

3. The travel lane boundary line detection apparatus according to claim 2, wherein, at the time the number of votes for the respective central positions is the same, the calculation unit calculates all the respective central positions as the candidate points of the central point of the composite line.

4. The travel lane boundary line detection apparatus according to claim 3, wherein the calculation unit
    selects the combinations of the edge points on the one side and the edge points on the other side, the edge points being disposed at intervals along the travel lane width direction within a predetermined threshold value, and
    performs voting for the central positions of the selected combinations in the travel lane width direction.

5. The travel lane boundary line detection apparatus according to claim 4, wherein
    the travel lane boundary line is a solid line,
    the auxiliary line is a dotted line,
    and the travel lane boundary line segment detected by the extraction unit is an edge line segment of the travel lane boundary line on the travel lane central side.

6. The travel lane boundary line detection apparatus according to claim 3, wherein
the travel lane boundary line is a solid line,
the auxiliary line is a dotted line,
and the travel lane boundary line segment detected by the extraction unit is an edge line segment of the travel lane boundary line on the travel lane central side.

7. The travel lane boundary line detection apparatus according to claim 2, wherein the calculation unit
selects the combinations of the edge points on the one side and the edge points on the other side, the edge points being disposed at intervals along the travel lane width direction within a predetermined threshold value, and
performs voting for the central positions of the selected combinations in the travel lane width direction.

8. The travel lane boundary line detection apparatus according to claim 7, wherein
the travel lane boundary line is a solid line,
the auxiliary line is a dotted line,
and the travel lane boundary line segment detected by the extraction unit is an edge line segment of the travel lane boundary line on the travel lane central side.

9. The travel lane boundary line detection apparatus according to claim 2, wherein
the travel lane boundary line is a solid line,
the auxiliary line is a dotted line,
and the travel lane boundary line segment detected by the extraction unit is an edge line segment of the travel lane boundary line on the travel lane central side.

10. The travel lane boundary line detection apparatus according to claim 1, wherein
the travel lane boundary line is a solid line,
the auxiliary line is a dotted line,
and the travel lane boundary line segment detected by the extraction unit is an edge line segment of the travel lane boundary line on the travel lane central side.

* * * * *